3,184,891
METHOD OF TREATING SOIL AND GROWING PLANTS

Karl Herman Frantzen, Omaha, Nebr., assignor to Northern Gas Products Company, Omaha, Nebr., a corporation of Delaware
No Drawing. Filed Sept. 18, 1962, Ser. No. 224,539
16 Claims. (Cl. 47—58)

This invention relates to novel methods of treating soil to facilitate cultivated plant growth and suppress propagation of pests.

The production of cultural or cultivated crops is known to be adversely effected by animal and vegetable pests of a wide variety including insects, worms, nematodes and many kinds of weeds. Procedures and treatments of the soil and/or plants which kill, or prevent or retard the growth of such pests without significantly adversely effecting the cultural plants, are obviously desirable.

It has been discovered according to the present invention that permeating soil with an alkane gas is a highly beneficial agronomical practice since cultural or cultivated plants propagated in soils so treated grow better and both animal and vegetable pests are suppressed. This process limits competition of natural occurring predatory organisms, such as weeds and insects, with a cutlivated crop. Soils used in greenhouses, for potted plants and field cultivation of plants, are beneficially treated by permeation with an alkane gas.

The alkane gases which are especially useful in this invention are those which are heavier than air, which are gases at room temperature and which can be liquified at above —60° F. Such gases permeate the soil readily and migrate a substantial distance from the point of contact with the soil. The gases should, however, be injected into the soil in order to facilitate permeation of the gas through the soil.

The gases most suitable for permeating the soil are propane and the butane gases such as n-butane, isobutane and tertiary butane. These gases are readily available and of low cost. In addition, they are commercially available in liquid form and desirably can be injected into the soil in this form. As the injected liquefied gas vaporizes, the heavier than air gas permeates the soil and migrates laterally to a considerable extent as well as vertically upwards and downwards, in a broadcast effect.

In the treatment of field soils, the liquid alkane gas can be injected beneath the soil at intervals of variable distance and depth of injection. Injection can be made by use of subsoil row injection equipment like that used in the application of anhydrous liquid ammonia. Liquid alkane gas can be injected at a depth of about 6 to 10 inches and desirably at about 8 inches, and in rows of any suitable width such that the amount of injected gas migrates laterally to meet the migrating gas from the adjacent row. In a medium heavy soil, three feet of lateral migration after several hours can be achieved. Also, the gas migrates downwardly considerably such as about 10 to 14 inches below where injected.

The amount of alkane gas to be injected into field soils will vary with the soil texture and its composition. Heavier soils will generaly require lower application rates than lighter soils. Usually, however, the application rate for field soils will be in the range of about 15 to 60 gallons of liquefied alkane gas per acre with a rate of about 30 gallons per acre being average.

The alkane gas can be applied to the soil in which crops are already growing, but care must be taken to apply the gas at a rate such that it has no significant adverse effect on the plants but does kill or retard growth of pests. Cultivated crops are generally more resistant to this agronomical practice than is natural occurring vegetation such as weeds. It is generally advisable, however, to permeate the soil with the alkane gas considerably before plants and plant seeds are planted in the soil. A period of not less than 5 days, and generally 10 days, should pass after application of the alkane gas before the soil is seeded or planted. Springtime application of the alkane gas during seedbed preparation appears to be most suitable.

Permeation of soils with an alkane gas appears to kill or retard growth of vegetable pests such as weeds and weed seeds and to do the same to various animal pests. By eliminating or suppressing the growth of weeds cultivated crops have less competition for the moisture and nutrients available in the soil and thus grow more vigorously. Weed seeds in the soil appear particularly susceptible to the alkane gas and their germination is often prevented and generally retarded or suppressed. The alkane gas retards growth of grasses other than cultivated grasses, such as blue grass, and also retards growth of broad leaf weeds. The alkane gas appears to have no or little effect on established legumes such as clover and alfalfa at application rates which affect weeds. Growth of soil insects such as cut worm, wire worm and larvae forms of moths are also retarded by the alkane gas treatment.

This invention is particularly useful in corn growing and cultivation of other row crops. By retarding weed growth in row crops, the cost of soil cultivation can be reduced or eliminated while increased growth and yield of the crops are obtained.

Only the usual safety precautions need be followed in applying the alkane gas to the soil. Injection of the liquid alkane gas at effective rates does not result in creation of a soil mixture which can be considered inflammable. An open flame applied to the surface of a field injected with the alkane gas is not propagated. The amount of gas injected and the speed of migration through the soil lead to a safe treatment that requires no special safety precautions.

The following example is presented to illustrate the invention.

Example

On April 27, a 22 acre field in central Iowa was tilled and then liquid normal butane injected 8 inches below the surface in four areas of the field in straight rows with an ammonia applicator which has injection knives spaced 30 inches apart. The first area of application was at a rate of 25 gallons of liquid normal butane per acre. The second area of application within the field was at the rate of 20 gallons per acre. The third area of application was at 15 gallons per acre. The above areas were spaced approximately one rod apart and were one rod in width and across the field lengthwise north and south. In like manner, liquid propane was injected on the same day in three different areas one rod in width and one rod spacings in the same manner. The first area of application of the propane was at the rate of 15 gallons per acre. The second area of propane was at the rate of 30 gallons per acre and the third was at 45 gallons per acre but in curvilinear row concave to the outermost straight propane row.

No flame was sustained or propagated by a lighted torch applied to the ground after injection with the normal butane and propane. Measurement with a gas scope indicated that both gases migrated laterally 10 inches and into the soil 2 inches below placement three hours after application.

Soil temperature at the time of applying the gases was 51° F. at a depth of 8 inches. No plant growth was visible on the surface and an examination of the soil showed no weed seed germination. On May 4 the field was inspected and no change in weed germination or growth from the previous week was apparent.

Corn was planted in the treated soil on May 15 at 2½ inch depth.

Another part of the farm referred to above in this example was planted in corn on May 15 in 40 inch rows at 2½ inch depth. The rows were approximately 60 rods in length and on fall plowing.

Liquid propane was injected on both sides of 17 corn rows using an apparatus having three tines and injection nozzles. An adjacent 18th row of corn had propane injected only on one side. Two rows were straddled on each pass. Two adjacent passes were made with injection rates of 120 pounds per acre (liquid propane has a density of about 4.24 pounds per gallon), then two passes at 80 pounds per acre, and then two passes at 160 pounds per acre. There was only a single injection of propane between adjacent rows of corn. Soil temperature was averaging 59° F. nighttime and 68° F. daytime at 6 inch depth. No germination of weed seeds had taken place.

Also, on May 17, liquid propane was injected at 200 pounds per acre on an area of established blue grass adjacent the corn field. It was injected at 8 inch depth in 40 inch rows.

On May 23, the fields treated and planted with corn as described above were inspected. The corn was up 2 inches. No weeds or insects were observed in either the treated or untreated areas. Ground temperature at 6 inch depth was an average of 63° F. nighttime and 69° F. daytime. The propane and butane applications showed no adverse effects on the corn crop, or the blue grass, at the application rates.

The fields were observed again on June 1. Neither propane nor n-butane appeared injurious to the corn. Weed growth was slower in the gas treated areas than in the untreated areas.

About June 14 the entire corn field was cultivated. Very little grass was present although some broad leaf plants were coming. Insect population was very low.

On June 21 liquid propane was injected into the soil between rows of corn in an area of the field not previously treated. Seventeen rows of corn were injected on each side with the propane. The equipment used straddled two rows of corn and injected liquid propane at 8 inch depth on each side, and between the two corn rows on each pass. Two passes (down and back) were made at 100 pounds per acre. Then down and back passes were made at 150 pounds per acre followed by down and back passes at 200 pounds per acre. An adjacent 18th row had an injection of propane on only one side of the row.

On June 28 the treated corn field was inspected and found to remain free of grass and weeds and very clean of insects. No damage to the corn was apparent.

The corn field was inspected again on July 12 and the treated area found to be very free of weeds compared to the untreated areas. The corn in the treated areas was somewhat more advanced than in untreated areas.

The field was observed again July 17 and secondary weed growth found to have been blocked by the application of propane and n-butane. In addition, the corn was 6 to 12 inches higher in the treated areas than in untreated areas and surrounding fields planted in corn the same date.

Corn grown on the treated soil appeared to have a medium to high level of nitrates present in the corn plant. Nitrates have been qualitatively detected above the ear within the stock quite generally in the corn on treated soil whereas in the untreated area nitrates appear at the second and third internode with practically no evidence of the nitrates in the areas above the ear.

Various changes and modifications of the invention can be made and, to the extent that such variations incorporate the spirit of this invention, they are intended to be included within the scope of the appended claims.

What is claimed is:

1. The agronomical practice which comprises permeating soil with an alkane gas in liquid form but which is gaseous at room temperature, can be liquefied at above −60° F. and is heavier than air.

2. The agronomical practice which comprises permeating soil with an alkane gas in liquid form but which is gaseous at room temperature, can be liquefied at above −60° F. and is heavier than air and propagating a crop in such treated soil.

3. The agronomical practice which comprises injecting an alkane gas in liquid form but which is gaseous at room temperature, can be liquefied at above −60° F. and is heavier than air at intervals beneath the surface of soil in which crops grow to permeate the soil with the gas and propagating a crop in such treated soil.

4. The process of claim 3 in which from about 15 to about 60 gallons of gas in liquid form per acre are used.

5. The agronomical practice which comprises injecting liquid propane at intervals beneath the surface of soil in which crops grow to permeate the soil with propane and propagating a crop in such treated soil.

6. The agronomical practice which comprises injecting a liquid butane at intervals beneath the surface of soil in which crops grow to permeate the soil with the butane and propagating a crop in such treated soil.

7. The process of claim 6 in which liquid n-butane is used.

8. The process of claim 6 in which liquid isobutane is used.

9. The agronomical practice which comprises injecting an alkane gas having three to four carbons in liquid form but which is gaseous at room temeprature, can be liquefied at above −60° F. and is heavier than air at intervals beneath the surface of soil in which crops grow to permeate the soil with the gas and planting a crop in such treated soil in not less than five days after injection of the gas.

10. The process of claim 9 in which the gas is liquid propane.

11. The process of claim 9 in which the gas is liquid n-butane.

12. The process of claim 9 in which the gas is liquid isobutane.

13. The process of claim 9 in which the crop is planted in not less than ten days after injection of the gas.

14. The process of culturing turf which comprises injecting an alkane gas having three to four carbons in liquid form but which is gaseous at room temperature, can be liquefied at above −60° F. and is heavier than air beneath the surface of the turf in sufficient amount to have a beneficial effect on the turf without adversely effecting the turf.

15. The agronomical practice which comprises injecting an alkane gas having three to four carbons in liquid form but which is gaseous at room temperature, can be liquefied at above −60° F. and is heavier than air at intervals beneath the surface of soil in which crops grow to permeate the soil with the gas and planting crop seed in such treated soil in not less than ten days after injection of the gas.

16. The process of claim 15 in which the crop seed is corn.

References Cited by the Examiner
UNITED STATES PATENTS 2,282,732  5/42  Lean.

OTHER REFERENCES

Chemical Abstracts, vol. 14, page 2390, published 1920, New Observations on the Biological Absorption of Methane—in Soils.

Chemical Abstracts, vol. 46, column 2216-E, 1952, Volatile Organic Emanations of the Soil.

Condensed Chemical Dictionary, Fifth Edition, Reinhold, N.Y., 1956, pages 40, 181, 182, 606.

Pirone, P. P.: The Response of Shade Trees to Natural Gas, in The Garden Journal, published by the New York Botanical Garden, N.Y., vol. 10, No. 1, pages 25–29, January-February 1960.

T. GRAHAM CRAVER, *Primary Examiner.*